United States Patent
Morini et al.

(10) Patent No.: US 7,098,164 B2
(45) Date of Patent: Aug. 29, 2006

(54) PROCESS FOR THE POLYMERIZATION OF OLEFINS

(75) Inventors: Giampiero Morini, Padua (IT); Giulio Balbontin, Ferrara (IT); Tiziano Dall'Occo, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 53 days.

(21) Appl. No.: 10/506,176

(22) PCT Filed: Feb. 28, 2003

(86) PCT No.: PCT/EP03/02147

§ 371 (c)(1),
(2), (4) Date: Aug. 30, 2004

(87) PCT Pub. No.: WO03/076479

PCT Pub. Date: Sep. 18, 2003

(65) Prior Publication Data

US 2005/0154157 A1    Jul. 14, 2005

(30) Foreign Application Priority Data

Mar. 8, 2002  (EP) .................... 02075949

(51) Int. Cl.
  *C08F 4/626* (2006.01)
  *C08F 4/629* (2006.01)
  *C08F 10/00* (2006.01)
(52) U.S. Cl. ............ 502/108; 502/115; 502/126; 526/124.3; 526/124.9; 526/348
(58) Field of Classification Search ........ 502/108, 502/115, 126; 526/124.3, 124.9, 348
See application file for complete search history.

(56) References Cited

U.S. PATENT DOCUMENTS

| 3,732,198 A | 5/1973 | Whiteley et al. ........ 260/94.9 |
| 4,220,554 A | 9/1980 | Scatá et al. ............ 252/429 B |
| 4,399,054 A | 8/1983 | Ferraris et al. ........ 252/429 B |
| 4,469,648 A | 9/1984 | Ferraris et al. ............... 264/9 |

FOREIGN PATENT DOCUMENTS

| EP | 0361493 | 4/1990 |
| EP | 0395083 | 10/1990 |
| EP | 0553805 | 8/1993 |
| EP | 0553806 | 8/1993 |
| EP | 0601525 | 6/1994 |
| EP | 0728769 | 8/1996 |
| WO | 9731030 | 8/1997 |
| WO | 9844009 | 10/1998 |
| WO | WO 99/48929 | * 9/1999 |
| WO | 0058374 | 10/2000 |
| WO | 0069924 | 11/2000 |

* cited by examiner

*Primary Examiner*—Caixia Lu
(74) *Attorney, Agent, or Firm*—Jarrod N Raphael; William R Reid

(57) ABSTRACT

A process for the (co) polymerization of olefins of formula $CH_2$=CHR wherein R is a hydrogen atom, a methyl or an ethyl radical, carried out in the presence of a system comprising (a) solid catalyst component comprising a compound of Ti or V not containing Metal-π bonds, Mg, halogen and optionally an electron donor compound; (b) an Al-alkyl compound; and (c) one or more non-polymerizing olefins in an amount up to 1.2% by mol with respect to the total olefins present in the reactor.

19 Claims, No Drawings

PROCESS FOR THE POLYMERIZATION OF OLEFINS

This application is the U.S. national stage of International Application PCT/EP03/02147, filed Feb. 28, 2003.

The present invention relates to a process for the (co) polymerization of olefins of formula $CH_2=CHR$ wherein R is a hydrogen atom, or a $C_1-C_2$ alkyl radical, carried out in the presence of a titanium or vanadium based catalyst system and of a specific amount of a non-polymerizing olefin.

Ziegler-Natta catalysts comprising titanium or vanadium compounds supported on $MgCl_2$, optionally in combination with one or more electron donors, are well know in the art and they are largely used in the industry for polymerizing alpha-olefins. In particular, they are extensively used in the preparation of the polyolefins that have had the greatest commercial success such as polyethylene, polypropylene and polybutene-1 (co)polymers.

One of the requirements for the catalyst to be used, especially, in the preparation of propylene and 1-butene polymers, is the capability to produce largely predominant amounts of isotactic polymers. This feature allows to simplify the polymerization process by eliminating the steps of atactic portion removal. Moreover, the increase of the stereospecificity improves important properties of the polymer, such as flexural modulus. Accordingly, the increase of the stereospecificity of the polymers is a long felt need.

WO 00/69924 relates to a process for increasing the molecular weight and/or the stereoregularity of polyolefins, by polymerizing alpha-olefins in the presence of a titanium containing Ziegler-Natta catalyst and in the presence of a non-polymerizing olefin. The document indicates that the effects of the invention are particularly visible when the molar percentage of non-polymerizing olefin, with respect to the total amount of olefins present in the reaction mixture, ranges from 0.5 to 8. The working examples show that when the lowest amount of non-polymerizing olefin is used (0.4% Example 15) the corresponding non-polymerizing olefin/titanium molar ratio is about 140. Moreover, it is important to note that the working examples are only dedicated to homopolymerization of hexene-1 or higher alpha-olefins and that evidence of the increase of the stereoregularity is shown only when the percentage of non-polymerizing olefin is relatively high (7.4% Examples 29–34). The use of such an amount of non-polymerizing alpha olefins however, is proved to be unsuitable when trying to polymerize lower alpha-olefins such as propylene because, as shown in the comparative examples reported below, only traces of polymer are obtained. An additional drawback is constituted by the worsening of some organoleptic properties of the polymer which results to be bad smelling and strongly colored. As a result, it would be necessary to carefully remove the non-polymerizing olefins from the polymer in order to have acceptable organoleptic properties. It would be therefore desirable to find a process for producing polymers of lowers olefins with increased isotacticity (expressed either in term of pentads or in term of xylene insoluble fraction) in the polymerization of lower olefins. It would also be desirable that the said process maintains an acceptable activity and, possibly, that it does not deteriorate to a non acceptable extent the organoleptic properties of the polymer.

The applicant has now surprisingly found a process capable to meet the above requirements.

It is therefore an object of the present invention a process for the polymerization of olefins of formula $CH_2=CHR$ wherein R is a hydrogen atom, a methyl or an ethyl radical carried out in the presence of a catalyst system comprising:

(a) solid catalyst component comprising a compound of Ti or V not containing Metal-$\pi$ bonds, Mg, halogen and optionally an electron donor compound;

(b) an Al-alkyl compound; and (c) one or more non-polymerizing olefins in an amount up to 1.2% by mol with respect to the total olefins present in the reactor.

Preferably the amount of non polymerizing olefin ranges from 0.0005% by mol to 0.45% by mol with respect to the total olefins present in the reactor; more preferably is comprised between 0.001% by mol and 0.30% by mol with respect to the total olefins present in the reactor, more preferably the amount of non-polymerizing olefin is comprised between 0.001% by mol and 0.25% by mol with respect to the total olefins present in the reactor.

The non-polymerizing olefin (c) is any olefin that will not substantially polymerize under the polymerization conditions, including either copolymerization and homopolymerization, so that it is not possible to detect its presence in the polymer chain of the final polymer by an NMR analysis carried out as described below.

The preferred olefins to be (co)polymerized are propylene and 1-butene.

Suitable non-polymerizing olefins have the following formula (I):

wherein:

$R^2$, $R^3$, $R^4$, $R^5$, equal to or different from each other, are hydrogen atoms, or linear or branched, saturated or unsaturated $C_1-C_{20}$ alkyl, $C_1-C_{20}$ alkenyl, $C_3-C_{20}$ cycloalkyl, $C_6-C_{20}$ aryl, $C_7-C_{20}$ alkylaryl or $C_7-C_{20}$ arylalkyl radicals; optionally two groups $R^2$, $R^3$, $R^4$, $R^5$ can join to form a $C_3-C_7$ membered aliphatic ring that can optionally bear $C_1-C_{20}$ alkyl substituents, with the proviso that at least two groups among $R^2$, $R^3$, $R^4$, $R^5$, preferably at least three groups among $R^2$, $R^3$, $R^4$, $R^5$ are different from a hydrogen atom.

More preferably the non-polymerizing olefins have the following formula (II):

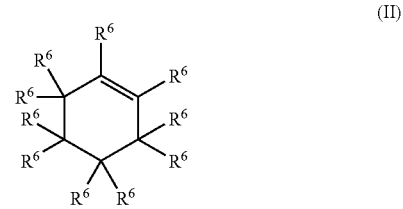

wherein:

$R^6$, equal to or different from each other, are hydrogen atoms, or linear or branched, saturated or unsaturated $C_1-C_{20}$ alkyl, $C_1-C_{20}$ alkenyl, $C_3-C_{20}$ cycloalkyl, $C_6-C_{20}$ aryl, $C_7-C_{20}$ alkylaryl or $C_7-C_{20}$ arylalkyl radicals; two $R^6$ groups can optionally join to form a $C_3$–$C_7$ membered aliphatic ring that can optionally bear $C_1$–$C_{20}$ alkyl substituents.

Non limitative examples of non-polymerizing olefins are: 2,3-dimethyl-buten-2-ene; 1-methyl-cyclohexene; beta-pinene; limonene; alpha-pinene; 2-carene; 3-Carene 1-phenyl cyclohexene, 2-methyl-but-2-ene, γ-terpinene, terpenolene, cholesteril chloride, 2,4-dimethyl-2-pentene, cis-3,4-dimethyl-2-pentene, trans-3,4-dimethyl-2-pentene, 2,3-dimethyl-3-heptene, 3,5-dimethyl-3-heptene, 2,5-dimethyl-2-hexene, 3-ethyl-2-pentene, 3-ethyl-3-hexene, farnesene, 3-methyl-2-hexene, cis-3-methyl-2-pentene, trans-3 methyl-2-pentene, 2-methyl-2-hexene, 2-methyl-2-pentene, 3-methyl-2-heptene, 3-methyl-3-heptene, 2-methyl-1-phenylpropene, 2,4,4-trimethyl-2-pentene, trans-3,4,4-trimethyl-2-pentene, Methyl cyclopentadiene, Valencene, Bisabolene, 2,5-dimethyl-2,4-hexadiene. 3-Carene is particularly preferred.

Preferably the solid catalyst component (a) used in the present invention comprises Ti or V compounds not containing metal-π bonds supported on Mg halide, preferably on $MgCl_2$, which is generally in its active form.

The catalyst components may also contain one or more (internal) electron-donors compounds. An electron-donor is particularly useful when the catalyst is employed in the synthesis of stereoregular polymers such as of propylene and 1-butene, where high stereospecificity is required to obtain polymers with an isotacticity index of greater than 90, or even greater than 94.

The internal electron-donor compound can be selected from ethers, esters, amines and ketones. A preferred class of electron donor compounds is that of alkyl, cycloalkyl or aryl esters of aliphatic or aromatic mono or polycarboxylic acids, such as benzoic, phthalic and succinic esters. Another class of preferred electron donor compounds is that of ethers and in particular of 1,3 diethers such as those disclosed in the European patent applications EP-A-361493 and EP 728769, the disclosure of which is incorporated herein by reference. When 1,3 diethers are used as internal donor the stereospecificity of the catalyst is sufficiently high to make the presence of an external-donor not strictly required.

Among succinic esters, specific examples are the following monosubstituted succinates: diethyl sec-butylsuccinate, diethyl thexylsuccinate, diethyl trimethylsilylsuccinate, diethyl cyclohexylsuccinate, diethyl benzylsuccinate, diethyl cyclohexyl(methyl)succinate, diethyl t-butylsuccinate, diethyl isobutylsuccinate, diethyl isopropylsuccinate, diethyl neopentylsuccinate, diethyl isopentylsuccinate and the corresponding diisobutyl esters.

Specific examples of disubstituted succinates are: diethyl 2-benzyl-2-isopropylsuccinate, diethyl 2,2-Cyclopentylsuccinate, diethyl 2,2-diisobutylsuccinate, diethyl 2-isopropyl-2-methylsuccinate, diethyl 2,2-diisopropylsuccinate, diethyl 2-isobutyl-2-ethylsuccinate, diethyl 2-isopentyl-2-isobutyl-succinate, diethyl 2,2-Cyclohexylsuccinate, diethyl 2,3-diisopropylsuccinate, diethyl 2,3-dicyclohexylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2-isopropyl-3-isobutylsuccinate, diethyl 2-t-butyl-3-isopropylsuccinate, diethyl 2-isopropyl-3-Cyclohexylsuccinate, diethyl 2-isopentyl-3-Cyclohexylsuccinate and the corresponding diisobutyl esters.

Specific examples of benzoic esters are ethylbenzoate, n-butylbenzoate, p-methoxy ethylbenzoate, p-ethoxy ethylbenzoate, isobutylbenzoate, and ethyl p-toluate.

Specific examples of phthalic esters are diethyl phthalate, di-n-propyl phthalate, di-n-butyl phthalate, di-n-pentyl phthalate, di-1-pentyl phthalate, bis(2-ethylhexyl) phthalate, ethyl-isobutyl phthalate, ethyl-n-butyl phthalate, di-n-hexyl phthalate, di-isobutylphthalate.

Suitable 1,3 diethers are those belonging to the general formula (III):

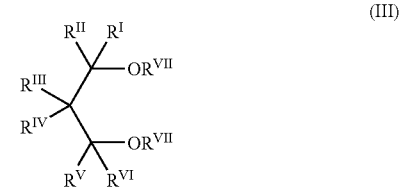

(III)

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals, $R^{III}$ and $R^{IV}$ form a condensed unsaturated cycle and $R^I$, $R^{II}$, $R^V$ and $R^{VI}$ are hydrogen.

Particularly preferred are the compounds in which $R^{VII}$ and $R^{VIII}$ are methyl while the radical $R^I$, $R^{II}$, $R^V$, and $R^{VI}$ radicals are hydrogen. Moreover, when $R^{III}$ is methyl, ethyl, propyl, or isopropyl, $R^{IV}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^{III}$ is hydrogen, $R^{IV}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^{III}$ and $R^{IV}$ can also be the same and can be ethyl, propyl, isopropyl, butyl, isobutyl, tert-butyl, neopentyl, phenyl, benzyl, cyclohexyl, cyclopentyl.

Moreover, particularly preferred are the 1,3-diethers of formula (IV)

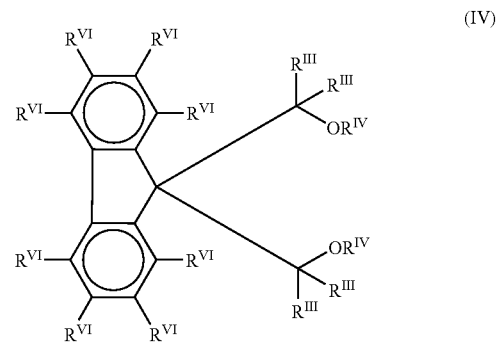

(IV)

where the $R^{VI}$ radicals equal or different are hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ are hydrogen or C1–C20 hydrocarbon groups and the radicals $R^{IV}$ are C1–C20 hydrocarbon groups preferably methyl.

Specific example of compounds belonging to the above formula are: 9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

Preferably the Ti compounds not containing π-bonds are selected from $TiCl_4$, $TiCl_3$ or $Ti(OR^7)_{n-y}X_y$, where n is the valence of titanium, y is a number between 1 and n and $R^7$ is a hydrocarbon radical containing up to 15 carbon atoms or a $—COR^8$ group, $R^8$ being a hydrocarbon radical containing up to 15 carbon atoms, and X being a halogen. Preferably the V compounds not containing π-bonds are selected from $VCl_3$, $VCl_4$, $VOCl_3$ and vanadyl halides. Most preferably, $TiCl_4$ or Ti haloalcoholates.

The Al-alkyl component (b) of the present invention is preferably selected among those of formula $H_jAlU_{3-j}$ or $H_jAl_2U_{6-j}$, where U substituents, same or different, are halogen atoms, $C_1$–$C_{20}$-alkyl, $C_3$–$C_{20}$-Cyclalkyl, $C_6$–$C_{20}$-aryl, $C_7$–$C_{20}$-alkylaryl or $C_7$–$C_{20}$-arylalkyl radical, optionally containing silicon or germanium atoms with the proviso that at least one U is different from halogen, and j ranges from 0 to 1, being also a non-integer number.

Non-limiting examples of aluminum-alkyl (b) compounds are $Al(Me)_3$, $Al(Et)_3$, $AlH(Et)_2$, $Al(iBu)_3$, $AlH(iBu)_2$, $Al(i-Hex)_3$, $Al(iOct)_3$, $AlH(iOct)_2$, $Al(C_6H_5)_3$, $Al(CH_2—CH(Me)CH(Me)_2)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$ and $Al_2(Et)_3Cl_3$, wherein Me=methyl, Et=ethyl, iBu=isobutyl, iHex=isohexyl, iOct=2,4,4-trimethyl-pentyl. The above mentioned Al-alkyl compounds can be used either alone or in mixtures thereof.

Amongst the above aluminium compounds, trimethylaluminium (TMA), triethylaluminum (TEAL) triisobutylaluminium (TIBAL) and tris(2,4,4-trimethyl-pentyl)aluminium (TIOA) are preferred.

A further object of the present invention is a catalyst system for the (co)polymerization of alpha-olefins of formula $CH_2=CHR$ wherein R is a hydrogen atom, or a $C_1$–$C_2$ alkyl radical comprising:

a) a solid catalyst component comprising a compound of Ti or V not containing Metal-π bonds, Mg, and halogen;
b) an Al-alkyl compound; and
c) one or more non-polymerizing olefins;

said catalyst system being characterized in that the molar ratio non-polymerizing olefin/titanium is lower than 100. Preferably the said molar ratio is lower than 80.

The said catalysts are able to produce polymer with increased isotacticity even in the presence of amounts of non-polymerizing olefins so small that the organoleptic properties of the polymers are not affected and the activity of the catalyst results to be substantially unchanged.

The preparation of the solid catalyst component (a) can be carried out according to several methods.

According to one of these methods, the magnesium dichloride in an anhydrous state and the succinate of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound is treated with halogenated hydrocarbons such as 1,2-dichloroethane, chlorobenzene, dichloromethane, etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, the electron donor compound. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the electron donor compound in solution at a temperature of about 80 to 120° C.

According to a preferred method, the solid catalyst component can be prepared by reacting a titanium compound of formula $Ti(OR^7)_{n-y}X_y$, where n, y X and $R^7$ have been described above, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The electron donor compound can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44009.

The solid catalyst components obtained according to the above method show a surface area (by B.E.T. method) generally between 20 and 500 m²/g and preferably between 50 and 400 m²/g, and a total porosity (by B.E.T. method)

higher than 0.2 cm$^3$/g preferably between 0.2 and 0.6 cm$^3$/g. The porosity (Hg method) due to pores with radius up to 10000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene, etc.) at temperatures between 80 and 130° C. The treatment with TiCl$_4$ in aromatic hydrocarbon solution can be repeated one or more times, and the electron donor compound is added during one or more of these treatments.

In any of these preparation methods the desired electron donor compound can be added as such or, in an alternative way, it can be obtained in situ by using an appropriate precursor capable to be transformed in the desired electron donor compound by means, for example, of known chemical reactions such as esterification, transesterification, etc. Generally, the electron donor compound is used in molar ratio with respect to the MgCl$_2$ of from 0.01 to 1 preferably from 0.05 to 0.5.

The catalyst system of the present invention comprises the components (a), (b) and (c) as described above. Although not strongly necessary, an external electron donor compound as component (d) can be added to the system.

The electron donor compound (d) is usually used in such an amount to give a molar ratio between the organoaluminum compound (b) and said electron donor compound (d) of from 0.1 to 500, preferably from 1 to 300 and more preferably from 3 to 100.

The external donor compound is preferably selected among silicon compounds of formula $R_a^d R_b^e Si(OR^f)_c$, where a and b are integer from 0 to 2, c is an integer from 1 to 3 and the sum (a+b+c) is 4; $R^d$, $R^e$, and $R^f$ are $C_1$–$C_{18}$ hydrocarbon groups optionally containing heteroatoms belonging to group 13–17 of the periodic table of the elements. Particularly preferred are the silicon compounds in which a is 1, b is 1, c is 2, at least one of $R^d$ and $R^e$ is selected from branched alkyl, alkenyl, alkylene, cycloalkyl or aryl groups with 3–10 carbon atoms optionally containing heteroatoms and $R^f$ is a $C_1$–$C_{10}$ alkyl group, in particular methyl. Examples of such preferred silicon compounds are cyclohexylmethyldimethoxysilane, diphenyldimethoxysilane, methyl-t-butyldimethoxysilane, dicyclopentyldimethoxysilane, 2-ethylpiperidinyl-2-t-butyldimethoxysilane and (1,1,1-trifluoro-2-propyl)-2-ethylpiperidinyldimethoxysilane and (1,1,1-trifluoro-2-propyl)-methyldimethoxysilane. Moreover, are also preferred the silicon compounds in which a is 0, c is 3, $R^f$ is a branched alkyl or cycloalkyl group, optionally containing heteroatoms, and $R^g$ is methyl. Examples of such preferred silicon compounds are cyclohexyltrimethoxysilane, t-butyltrimethoxysilane and thexyltrimethoxysilane.

The catalyst components (a), (b), (c) and optionally (d) can be contacted with each other in any order.

In a particular embodiment the components (a), (b) and (c) are pre-contacted for a period of time ranging from 0.1 to 30 minutes before being subject to polymerization conditions.

In an alternative embodiment they can be introduced directly into the reactor.

In particular, with the process of the present invention it is possible to (co)polymerize propylene and ethylene in order to prepare different kinds of products. For example the following products can be prepared: high density ethylene polymers (HDPE, having a density higher than 0.940 g/cm$^3$), comprising ethylene homopolymers and copolymers of ethylene with α-olefins having 3–12 carbon atoms; linear low density polyethylenes (LLDPE, having a density lower than 0.940 g/cm$^3$) and very low density and ultra low density (VLDPE and ULDPE, having a density lower than 0.920 g/cm$^3$, to 0.880 g/cm$^3$) consisting of copolymers of ethylene with one or more α-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other α-olefins having a content of units derived from propylene higher than 85% by weight (random copolymers); shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight. Moreover homopolymer of 1-butene or random compolymer of 1-butene can be obtained.

By using the process of the present invention it is possible to obtain a polymer having an improved tacticity (in terms of mmmm pentads value), a lower xylene soluble content and a higher molecular weight.

The polymerization can be carried out for example in slurry using as diluent an inert hydrocarbon solvent, or in bulk using the liquid monomer (for example propylene) as a reaction medium. Moreover, it is possible to carry out the polymerization process in gas-phase operating in one or more fluidized or mechanically agitated bed reactors.

In the process of the present invention the catalyst can be used as such by introducing it directly into the reactor. In the alternative, the catalyst can be pre-polymerized before being introduced into the first polymerization reactor. The term pre-polymerized, as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component.

The pre-polymerization can be carried out with the α-olefins selected from the same group of olefins disclosed before. In particular, it is especially preferred pre-polymerizing ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0 to 80° C. preferably from 5 to 50° C. in liquid or gas-phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

EXAMPLES

General Procedures and Characterizations

Determination of Xylene Insolubles (X.I.)

2.5 g of polymer were dissolved in 250 mL of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

NMR Spectra

The carbon spectra of the polymers were obtained using a Bruker DPX 400 spectrometer operating in the Fourier transform mode at 120° C. and 100.61 MHz. A sample of the xylene insoluble fraction were dissolved in $C_2D_2Cl_4$. As a reference, the peak of the mmmm pentad in the $^{13}C$ spectra (21.8 ppm) was used.

The carbon spectra were acquired with a 90° pulse and 12 seconds (15 seconds for ethylene based polymers) of delay between pulses and CPD (waltz 16) to remove $^1H$—$^{13}C$ couplings. About 3000 transients were stored for each spectrum.

Comonomer Content in the Copolymer:

(1-butene) was determined via Infrared Spectrometry.

Intrinsic Viscosity:

The measurement were done in tetrahydro-naphtalene (THN) solution obtained by dissolving the polymer at 135° C. for 1 hour.

Thermal Analysis:

Calorimetric measurements were performed by using a differential scanning calorimeter DSC Mettler. The instrument is calibrated with indium and tin standards. The weighted sample (5–10 mg), obtained from the Melt Index determination, was sealed into aluminum pans, heated to 200° C. and kept at that temperature for a time long enough (5 minutes) to allow a complete melting of all the crystallites. Successively, after cooling at 20° C./min to −20° C., the peak temperature was assumed as crystallisation temperature (Tc). After standing 5 minutes at 0° C., the sample was heated to 200° C. at a rate of 20° C./min. In this second heating run, the peak temperature was assumed as melting temperature (Tm) and the area as the global melting hentalpy (ΔH).

Melt Index:

The value is correlated with the polymer molecular weight, increasing the Melt Index value, decreases the polymer molecular weight.

Melt index (M.I.) are measured at 190° C. following ASTM D-1238 over a load of:

2.16 Kg, MI E=$MI_{2.16}$.

21.6 Kg, MI F=$MI_{21.6}$.

Preparation of Solid Catalyst Component A.

Into a 500 ml four-necked round flask, purged with nitrogen, 250 ml of $TiCl_4$ were introduced at 0° C. Then 10.0 g of microspheroidal $MgCl_2.2.8C_2H_5OH$ (prepared according to the method described in ex. 2 of U.S. Pat. No. 4,399,054 but operating at 3,000 rpm instead of 10,000) and an amount of 9,9-bis(methoxymethyl)fluorene were added under stirring (molar ratio Mg/9,9-bis(methoxymethyl)fluorene=6). The temperature was raised to 100° C. and maintained for 120 min. Then, the stirring was discontinued, the solid product was allowed to settle and the supernatant liquid was siphoned off.

250 ml of fresh $TiCl_4$ were added. The mixture was reacted at 120° C. for 60 min and, then, the supernatant liquid was siphoned off. The solid was washed six times with anhydrous hexane (6×100 ml) at 60° C. Finally, the solid was dried under vacuum. The resulting solid was found to contain 3.5% by weight of titanium, and 16.4% by weight of internal donor.

Preparation of Solid Catalyst Component B.

The same procedure, described for the preparation of the solid component A, was followed; except that 10.0 g of microspheroidal $MgCl_2.2C_2H_5OH$ and di-isobutylphthalate were used as support and internal donor.

The solid was found to contain 2.4% by weight of titanium, and 9.1% by weight of internal donor.

Preparation of Solid Catalyst Component C.

The same procedure, described for the preparation of the solid component A, was followed; excepting than diethyl 2,3-bis(isopropyl)succinate was used as internal donor instead of 9,9-bis(methoxymethyl)fluorene.

The solid was found to contain 3.4% by weight of titanium, and 10.8% by weight of internal donor.

Preparation of Solid Catalyst Component D.

Into a 500 ml four-necked round flask, purged with nitrogen, 250 ml of $TiCl_4$ were introduced at 0° C. Then, 10.0 g of microspheroidal $MgCl_2.2.8C_2H_5OH$ (prepared according to the method described in ex. 2 of U.S. Pat. No. 4,399,054 but operating at 3,000 rpm instead of 10,000) and an amount of ethyl benzoate such as to give, with respect to Mg, a molar ratio of 3 were added under stirring. The temperature was raised to 100° C. and maintained for 60 min. Then, the stirring was discontinued, the solid product was allowed to settle and the supernatant liquid was siphoned off.

250 ml of fresh $TiCl_4$ were added. The mixture was reacted at 100° C. for 60 min and, then, the supernatant liquid was siphoned off. The solid was washed six times with anhydrous hexane (6×100 ml) at 60° C. Finally, the solid was dried under vacuum. The resulting solid was found to contain 3.3% by weight of titanium, and 13.2% by weight of internal donor.

Preparation of Solid Catalyst Component E.

Solid catalyst component E was prepared according to example 3 of E-A-395 083.

Examples 1–7 and Comparative Examples 1–4

In a 4 liter autoclave, purged with nitrogen flow at 70° C. for one our, 75 ml of anhydrous hexane containing 760 mg of AlEt$_3$, an amount of 3-Carene as reported in Table 1, and 10 mg of solid catalyst component as reported in Table 1 were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The unreacted propylene was flashed off and the polymer was recovered and dried at 70° C. under vacuum for three hours. Polymerization results and polymer data are reported in Table 1. No traces of (co)polymerized 3-carene were found in the polymer.

Examples 8–9 and Comparative Examples 5–6

In a 4 liter autoclave, purged with nitrogen flow at 70° C. for one our, 75 ml of anhydrous hexane containing 760 mg of AlEt$_3$, an amount of 3-Carene and of Dicyclopentyldimethoxysilane, as reported in Table 2 and 10 mg of solid catalyst component B) were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The unreacted propylene was flashed off and the polymer was recovered and dried at 70° C. under vacuum for three hours. Polymerization results and polymerization data are reported in Table 2. No traces of (co)polymerized 3-carene were found in the polymer.

Example 10

The same polymerisation procedure of Examples 1, 2 and comparative example 2 was followed, excepting that 10.5 g of 1-phenyl-1-Cyclohexene instead of 3–Carene (0.2% molar) were used. a polymer having a xylene insoluble fraction of 80.3% by weight was obtained (activity of the catalyst was 18 Kg/gcat). No traces of (co)polymerized 1-phenyl-1-cyclohexene were found in the polymer.

Comparative Examples 7–8

In a 250 mL reactor, purged with nitrogen flow at 70° C. for one our, containing 150 mL of 1-octene and 340 mg of AlEt$_3$, a slurry of 10 mL of anhydrous hexane, 110 mg of AlEt$_3$, 15 mg of catalyst A) and the amount of 3-Carene reported in Table 3 were added at 70° C. The polymerization was carried out at this temperature for four hours; then, it was stopped by the addition of 2 mL of methanol to the reaction mixture. The polymer was recovered by precipitation into an excess of methanol, acidified with HCl, filtrated and dried. Polymerisation results and polymer data are reported in Table 3. No traces of (co)polymerized 3-Carene were found in the polymer.

Example 11 and Comparative Example 9

A 4.0 liter stainless-steel autoclave equipped with a magnetic stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (150 g), ethylene (7.0 bar, partial pressure) and hydrogen (2.0 bar, partial pressure).

In a 100 cm$^3$ three neck glass flask were introduced in the following order, 50 cm$^3$ of anhydrous hexane, 9.6 cm$^3$ of 10% by wt/vol, TEAL/hexane solution, 3-Carene (when used as reported in table 5) and the solid catalyst E (in the amount reported in table 5). They were mixed together and stirred at room temperature for 10 minutes and then introduced in the reactor through the steel vial by using a nitrogen overpressure.

Under continuous stirring, the total pressure was maintained constant at 75° C. for 120 minutes by feeding ethylene. At the end the reactor was depressurised and the temperature was dropped to 30° C. The recovered polymer was dried at 70° C. under a nitrogen flow and weighted. The amount of recovered polymer and the polymer characteristics are reported in table 4.

TABLE 1

| | Catalyst type | 3-Carene g | *3-Carene % molar | Yield Kg/gcat | X.I. wt % | mmmm % |
|---|---|---|---|---|---|---|
| Example 1 | A | 2.7 | 0.07 | 50 | 98.2 | 98.3 |
| Example 2 | A | 9.13 | 0.2 | 25 | 98.7 | 98.3 |
| Comp. Ex. 1 | A | 0 | 0 | 70 | 97.5 | 96.9 |
| Comp. Ex. 2 | A | 51.00 | 1.3 | Traces | n.a. | n.a. |
| Comp. Ex. 3 | A | 257.33 | 6.2 | Traces | n.a. | n.a. |
| Example 3 | B | 0.91 | 0.02 | 27 | 91.4 | n.a. |
| Example 4 | B | 9.12 | 0.2 | 25 | 94.9 | 93.0 |
| Example 5 | B | 0.046 | 0.001 | 27 | 80 | n.a. |
| Comp. Ex. 4 | B | 0 | 0 | 22 | 63 | 88.4 |
| Example 6 | C | 9.12 | 0.2 | 27 | 97.6 | n.a. |
| Example 7 | D | 9.12 | 0.2 | 13 | 85.2 | n.a. | n.a. not available
*referred to the total olefin present in the reactor

TABLE 2

| | 3-Carene g | 3-Carene* % molar | Al/Silane molar ratio | Yield Kg/gcat | X.I. wt % | mmmm % |
|---|---|---|---|---|---|---|
| Example 8 | 0.46 | 0.01 | 200 | 42 | 98.2 | n.a. |
| Comp. Ex. 5 | 0 | 0 | 200 | 47 | 97.5 | n.a. |
| Example 9 | 0.46 | 0.01 | 40 | 50 | 98.8 | 98.5 |
| Comp. Ex. 6 | 0 | 0 | 40 | 55 | 98.5 | n.a. | n.a. not available
*referred to the total olefin present in the reactor

TABLE 3

| | 3-Carene g | 3-Carene* % molar | Yield Kg/gcat | mmmm % |
|---|---|---|---|---|
| Comp. Ex 7 | 0.37 | 0.3 | 2.7 | 94.0 |
| Comp. Ex. 8 | 0 | 0 | 3 | 94.2 | n.a. not available
*referred to the total olefin present in the reactor

The results of Table 3 clearly show that the use of low amounts of non-polymerizing olefin in the polymerization of 1-octene does not positively affect the stereoregularity.

TABLE 4

| Ex. | Cat mg | 3 Carene mmoli: | 3-carene* % molar | Yield Kg/gcat | Melt Index dg/min E | Melt Index dg/min F/E | 1-C$_4$- wt. %. | D. S. C. Tm ° C. |
|---|---|---|---|---|---|---|---|---|
| Comp. Ex 9 | 15.2 | 0 | 0 | 11.8 | 15.6 | 35.6 | 13.9 | 122.0 |
| 11 | 24.7 | 8.8 | 0.18 | 10.5 | 1.7 | 26.9 | 6.6 | 124.4 |

*referred to the total olefin present in the reactor

From the data reported in the table, clearly appears that the use of 3-carene produce polymer with higher molecular weight (i.e. lower value of the melt Index).

The invention claimed is:

1. A process for (co)polymerizing olefins of formula $CH_2$=CHR wherein R is hydrogen, methyl, or ethyl, carried out in presence of a catalyst system in a reactor comprising:
   (a) solid catalyst component comprising a compound of Ti or V not containing Metal-π bonds, Mg, halogen and optionally an electron donor compound;
   (b) an Al-alkyl compound; and
   (c) at least one non-polymerizing olefins an amount from 0.0005% by mol to 0.45% by mol with respect to a total olefins amount in the reactor.

2. The process according to claim 1, wherein the amount of non-polymerizing olefin ranges from 0.001% by mol to 0.30% by mol with respect to the total olefins amount in the reactor.

3. The process according to claim 1, wherein the non-polymerizing olefins have formula (I):

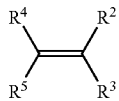

(I)

wherein $R^2$, $R^3$, $R^4$, $R^5$, equal to or different from each other, are hydrogen, or a linear or branched, saturated or unsaturated $C_1$–$C_{20}$ alkyl, $C_1$–$C_{20}$ alkenyl, $C_3$–$C_{20}$ cycloalkyl, $C_6$–$C_{20}$ aryl, $C_7$–$C_{20}$ alkylaryl or $C_7$–$C_{20}$ arylalkyl; optionally two groups $R^2$, $R^3$, $R^4$, $R^5$ can join to form a $C_3$–$C_7$ membered aliphatic ring that can optionally bear $C_1$–$C_{20}$ alkyl substituents, with the proviso that at least two of the group consisting of $R^2$, $R^3$, $R^4$, $R^5$ are different from hydrogen.

4. The process according to claim 3, wherein the non-polymerizing olefins have formula (II):

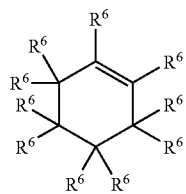

(II)

wherein $R^6$, equal to or different from each other, are hydrogen, or a linear or branched, saturated or unsaturated $C_1$–$C_{20}$ alkyl, $C_1$–$C_{20}$ alkenyl, $C_3$–$C_{20}$ cycloalkyl, $C_6$–$C_{20}$ aryl, $C_7$–$C_{20}$ alkylaryl or $C_7$–$C_{20}$ arylalkyl; wherein two $R^6$ groups can optionally join to form a $C_3$–$C_7$ membered aliphatic ring that can optionally bear $C_1$–$C_{20}$ alkyl substituents.

5. The process according to claim 3, wherein the non polymerizing olefin is 2,3-dimethyl-buten-2-ene, 1-methyl-cyclohexene, beta-pinene, limonene, alpha-pinene, 2-carene or 3-carene.

6. The process according to claim 5, wherein the non polymerizing olefin is 3-carene.

7. The process according to claim 1, wherein the olefins of formula $CH_2$=CHR are propylene and 1-butene.

8. The process according to claim 1, wherein the solid catalyst component (a) comprises a compound of Ti selected from $TiCl_4$, $TiCl_3$ or $Ti(OR^7)_{n-y}X_y$, wherein n is a valence of titanium, y is a number between 1 and n, and $R^7$ is a hydrocarbon containing up to 15 carbon atoms or —$COR^8$, $R^8$ is a hydrocarbon containing up to 15 carbon atoms and X is a halogen, supported on Mg dihalide.

9. The process according to claim 1, wherein the solid catalyst component (a) further comprises an internal electron donor.

10. The process according to claim 9, wherein the internal electron donor compound is an ether, an ester, an amine, or a ketone.

11. The process according to claim 10, wherein the internal electron donor compound is selected from alkyl, cycloalkyl, or aryl esters of aliphatic or aromatic mono or polycarboxylic acids and 1,3-diethers.

12. The process according to claim 11, wherein the internal electron donor compound is selected from benzoates, phthalates, and succinates.

13. The process according to claim 11, wherein the internal electron donor compound is selected from 1,3-diethers of formula (IV):

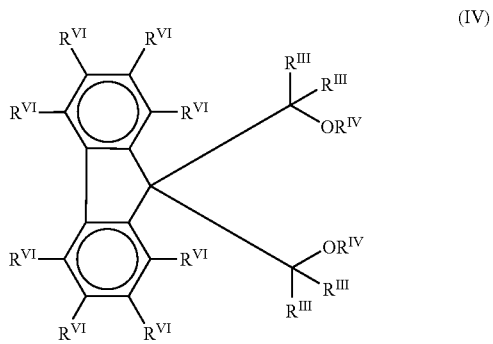

(IV)

wherein $R^{VI}$, equal to or different from each other, are hydrogen, a halogen, a $C_1$–$C_{20}$ alkyl, a linear or branched, $C_3$–$C_{20}$ cycloalkyl, $C_6$–$C_{20}$ aryl, $C_7$–$C_{20}$ alkylaryl and $C_7$–$C_{20}$ aralkyl, optionally containing at least one heteroatom selected from the group consisting of N, 0, S, P, Si, and halogens, as substitutes for carbon or hydrogen atoms, or both; $R^{III}$, equal to or different from each other, are hydrogen or a C1–C20 hydrocarbon; and $R^{IV}$, equal to or different from each other, are a C1–C20 hydrocarbon.

14. The process according to claim 13, wherein $R^{IV}$ is methyl.

15. A catalyst for (co)polymerizing olefins of formula $CH_2$=CHR wherein R is hydrogen, methyl, or ethyl comprising:
   (a) a solid catalyst component comprising a compound of Ti or V not containing Metal-$\pi$ bonds, Mg, and halogen;
   (b) an Al-alkyl compound; and
   (c) at least one non-polymerizing olefin;

wherein a molar ratio of non-polymerizing olefin/titanium is lower than 100.

16. The catalyst according to claim 15, wherein the molar ratio is lower than 80.

17. The process of claim 13, wherein $R^{VI}$ is selected from Cl and F.

18. The process of claim 13, wherein the heteroatom is selected from Cl and F.

19. The process of claim 3, wherein at least three of the group consisting of $R^2$, $R^3$, $R^4$, and $R^5$ are different from hydrogen.

* * * * *